United States Patent [19]
Styra

[11] Patent Number: 6,098,696
[45] Date of Patent: Aug. 8, 2000

[54] SECTIONAL DOOR

[75] Inventor: Ludger Styra, Bielefeld, Germany

[73] Assignee: Overhead Door Corporation, Dallas, Tex.

[21] Appl. No.: 09/078,745

[22] Filed: May 14, 1998

[51] Int. Cl.[7] .................................................. E05D 15/20
[52] U.S. Cl. ............................ 160/201; 160/40; 160/233
[58] Field of Search .................................. 160/201, 207, 160/229.1, 232, 233, 40; 16/355, 356

[56] References Cited

U.S. PATENT DOCUMENTS

| | | | |
|---|---|---|---|
| 3,056,451 | 10/1962 | Federline et al. | 160/201 |
| 3,076,499 | 2/1963 | Zoll et al. | 160/41 |
| 3,118,702 | 1/1964 | Kale et al. | 296/106 |
| 3,359,594 | 12/1967 | Pastoor | 16/178 |
| 3,489,200 | 1/1970 | Recchione | 160/133 |
| 3,693,693 | 9/1972 | Court | 160/195 |
| 4,315,345 | 2/1982 | Schijf | 16/267 |
| 4,532,973 | 8/1985 | DeFalco | 160/235 |
| 4,573,240 | 3/1986 | Labelle | 16/355 |
| 4,630,664 | 12/1986 | Magro | 160/232 |
| 4,736,785 | 4/1988 | Seuster | 160/264 |
| 4,771,816 | 9/1988 | Clay, Jr. | 160/235 |
| 4,787,121 | 11/1988 | Racenis et al. | 16/356 |
| 4,930,561 | 6/1990 | Clay | 160/229 |
| 4,957,301 | 9/1990 | Clay, Jr. et al. | 277/12 |
| 4,979,553 | 12/1990 | Lowry, III et al. | 160/133 |
| 5,365,993 | 11/1994 | Jella | 160/201 |
| 5,564,164 | 10/1996 | Jella | 16/355 |

*Primary Examiner*—David M. Purol
*Attorney, Agent, or Firm*—Akin, Gump, Strauss, Hauer & Feld, L.L.P.

[57] ABSTRACT

A sectional upward-acting door, particularly adapted for use with mobile cargo containers and the like includes extruded door panels or sections which are hingedly connected to each other by hook-like hinge members integrally formed along a top edge of one section and an arcuate channel defined by a bottom wall and an integral pintle on an adjacent section. An elastomer seal and bearing member fits within the channel formed along the bottom edge of a section for engaging the hinge member and for aiding in forming a weather and light seal at the hinge joint between sections. The sections are laterally assembled by engagement of the hook-like hinge member in the channel of an adjacent section and are retained in assembly by a releasable retainer and seal member which may be formed as a co-extruded dual durometer part. Door side edge seals are insertable in a space formed between door side edge guide tracks and an inner surface of a rear wall of the cargo container.

29 Claims, 6 Drawing Sheets

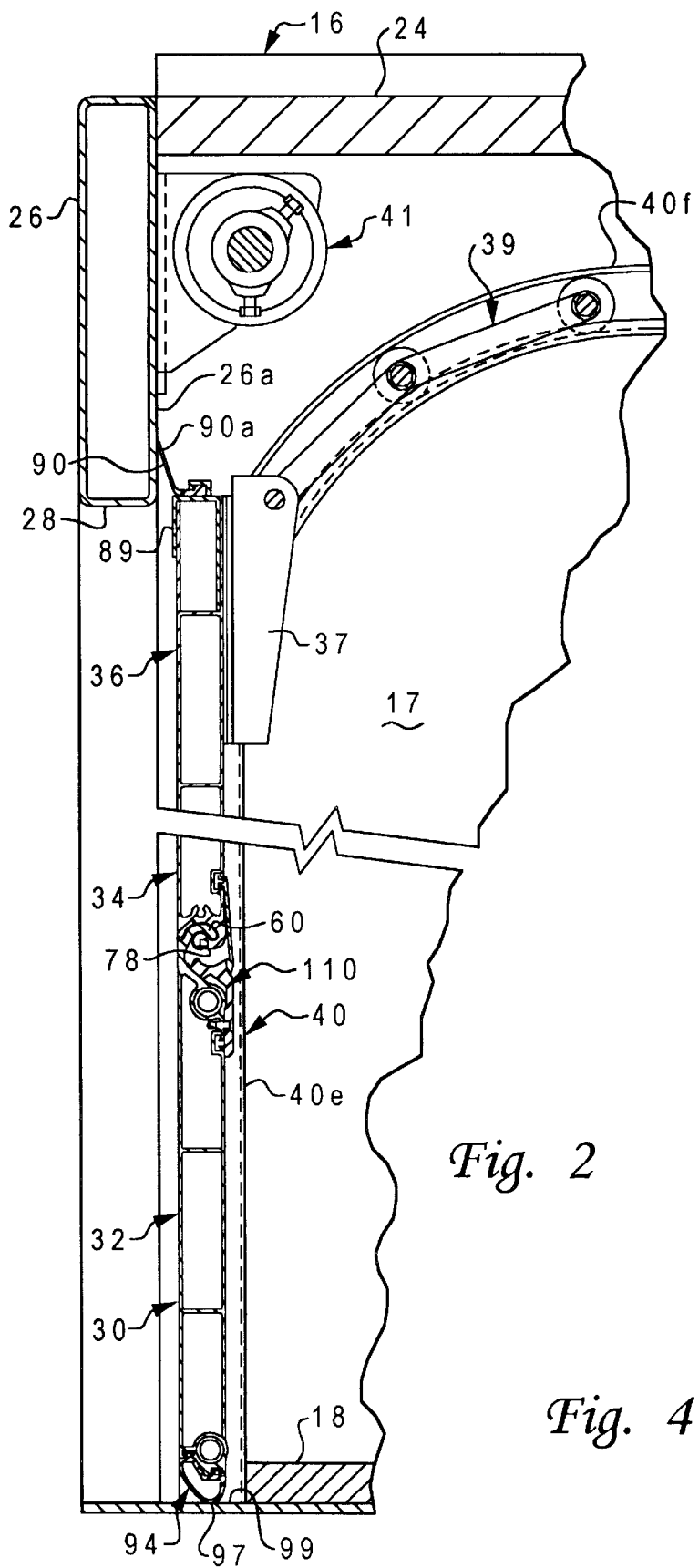
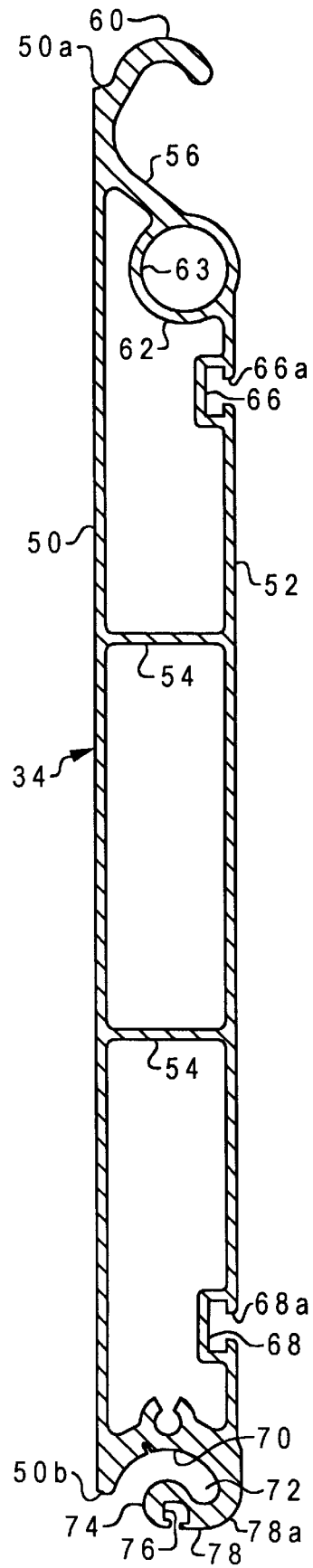
Fig. 2
Fig. 4

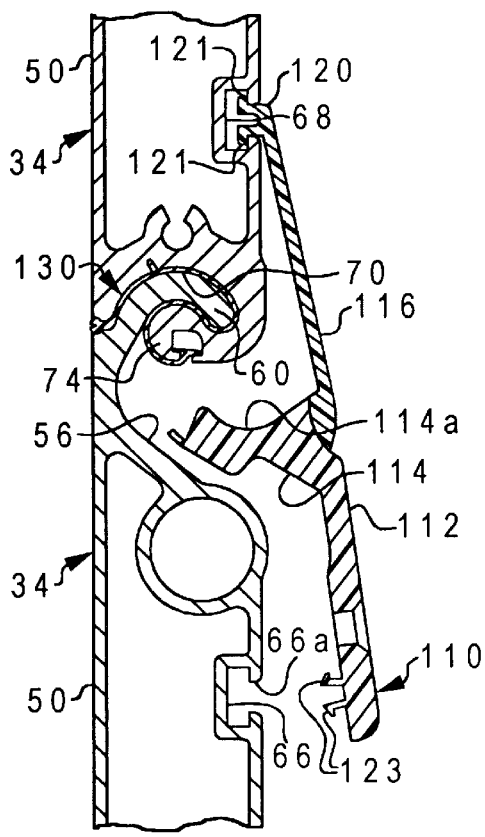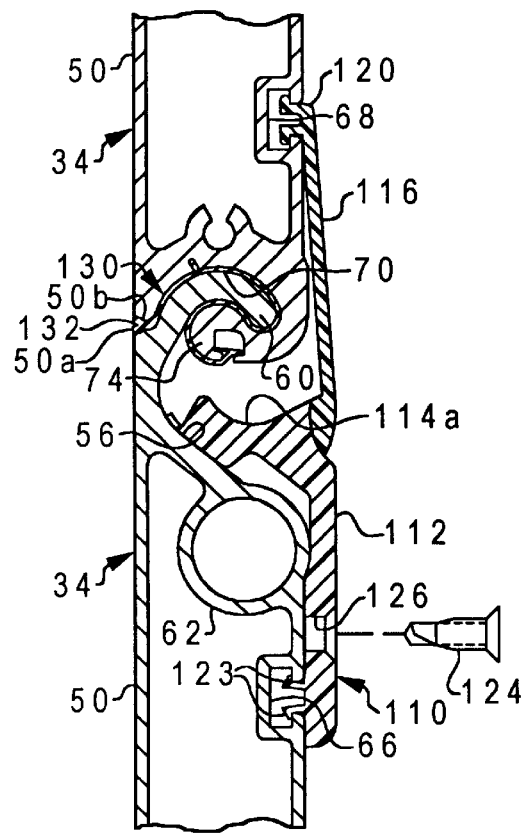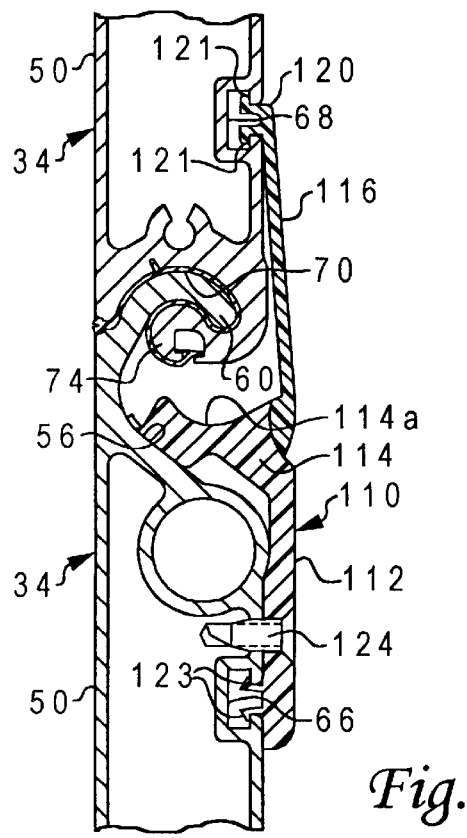
Fig. 7a
Fig. 7b
Fig. 7c

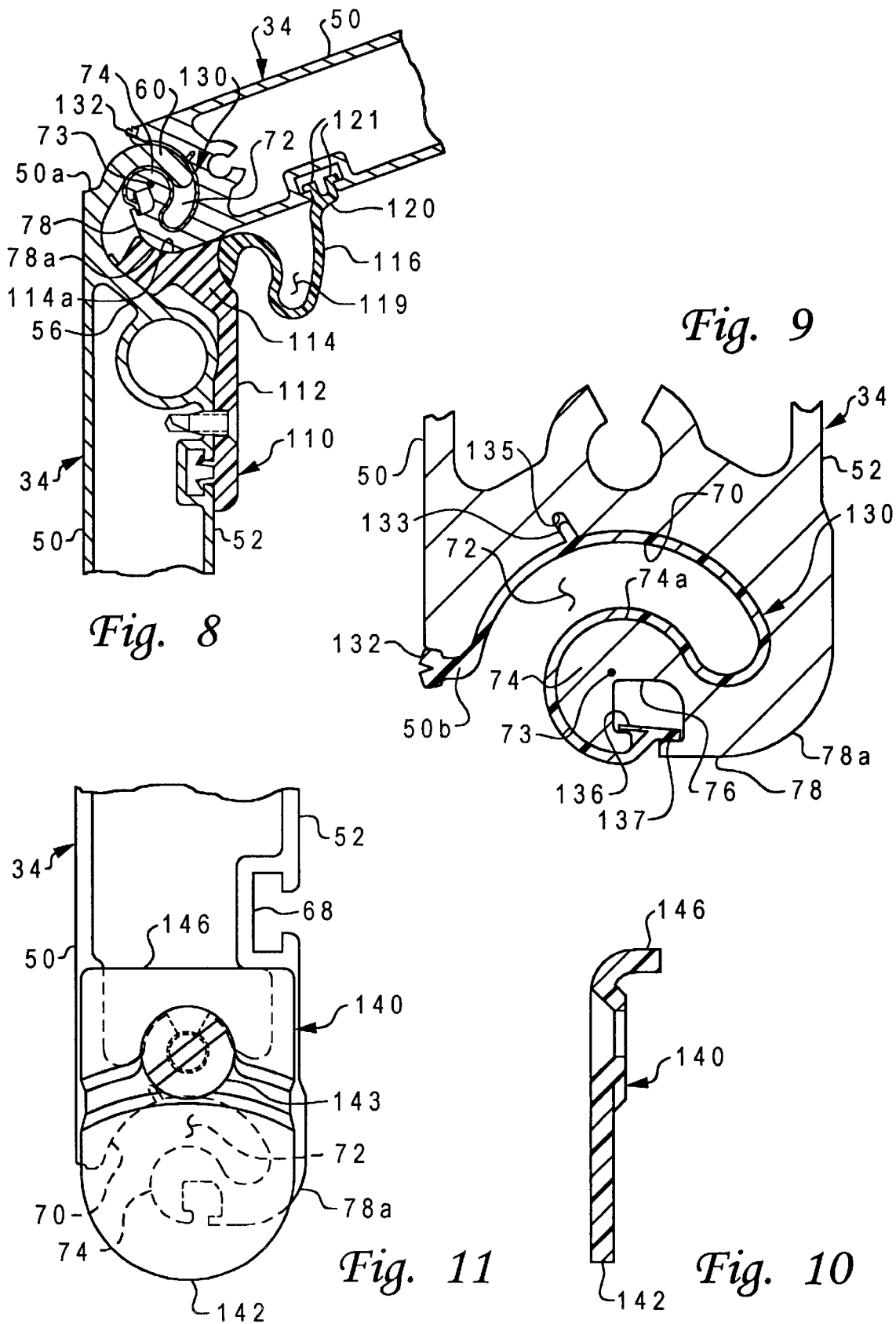

SECTIONAL DOOR

FIELD OF THE INVENTION

The present invention pertains to a sectional upward-acting door including plural extruded panels or sections with integral hinges, improved light and weather seals at the hinges and the door edges and an overall configuration which facilitates easy assembly and disassembly.

BACKGROUND OF THE INVENTION

In the development of sectional doors, particularly of the so-called roller shutter type used for doors in van-type truck bodies or trailers, there has been a continuing need to develop a door which is easy to fabricate, durable and includes substantially weather-tight seals at the hinge connections between the door sections and at the door edges. There has also been a continuing need to develop sectional, roller shutter type doors and the like which are easy to assemble and disassemble with respect to the interconnected panels and with respect to the side edge door guides or support tracks. Although a substantial variety of sectional doors have been developed, some of which are adapted for vehicle use in van-type truck bodies and trailers, many of the specialized requirements for these doors including light weight, low cost to manufacture, ease of assembly and weather tightness have not been entirely met by conventional doors heretofore known. It is to these ends that the present invention has been developed.

SUMMARY OF THE INVENTION

The present invention provides an improved sectional door, particularly adapted for use as an upward-acting door in over-the-road cargo truck bodies and trailers and in other cargo container applications.

In accordance with one aspect of the invention, a sectional upward-acting door is provided which includes plural interconnected door sections or panels which are preferably formed of extruded lightweight metal, such as aluminum, or extruded plastic, such as a PC-ABS (polycarbonate-acrylonitrile-butadiene-styrene) blend, for example. The door sections include integral hinge members extending along opposed longitudinal edges of the door sections, which hinge members are easy to assemble and disassemble with respect to each other in a lateral direction.

In accordance with another aspect of the invention, a sectional door is provided with a unique weather seal between the hinge members of adjacent interconnected door sections, which seal also serves as a hinge-bearing member and reduces door rattle type noise during transport or operation of the door itself.

The present invention further provides an improved sectional door having a combination retainer and seal or water channeling member for support on adjacent door sections at the hinge connection therebetween and which permits ease of assembly and disassembly of the door sections, laterally with respect to each other but also prevents unwanted disassembly of the door sections under normal operating conditions.

The sectional door of the present invention is advantageously formed of plural panels or sections which may be fabricated of extruded, lightweight metal or other suitable materials wherein the hinge members which interconnect with adjacent hinge members of other sections are integrally formed as part of the door panel or section. Support portions for roller guides or the like are integrally formed as part of the section as well as channels for connecting ancillary members to the section, such as retainers and seals or water deflector members.

Those skilled in the art will further appreciate the above-identified advantages and features of the sectional door of the present invention as well as other important aspects thereof upon reading the detailed description which follows in conjunction with the drawing.

BRIEF DESCRIPTION OF THE DRAWINGS

FIG. 2 is a section view taken generally along the line 2—2 of FIG. 1;

FIG. 4 is a section view of one of the intermediate door sections or panels illustrating the configuration of the integral hinge members across the top and bottom edges of the panel;

FIGS. 7a through 7c illustrate details of the section retainer and water deflector or seal being assembled between door sections;

FIG. 8 is a section view illustrating the maximum rotation of one door section relative to the other with the section retainer and weather seal in place;

FIG. 9 is a detail section view of a hinge seal and bearing member for the door of the present invention;

FIG. 10 is a transverse section view of a door section stop member;

FIG. 11 is a side elevation of the stop member shown in FIG. 10 connected to the lower edge of a door section.

DETAILED DESCRIPTION OF A PREFERRED EMBODIMENT

Figure 1:
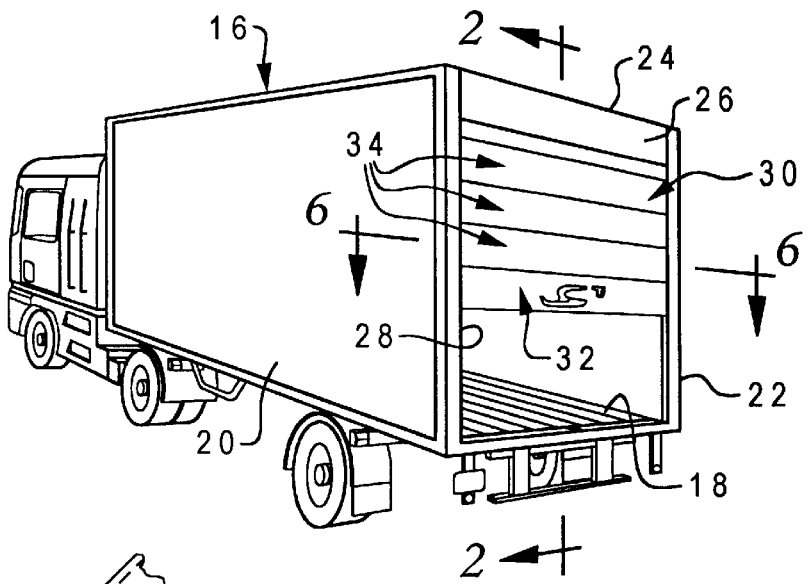
FIG. 1 is a perspective view of a motor truck cargo trailer equipped with a sectional door in accordance with the present invention.

In the description which follows like elements are marked throughout the specification and drawing with the same reference numerals, respectively. The drawing figures are not necessarily to scale and certain features of the invention may be shown exaggerated in scale or in somewhat schematic form in the interest of clarity and conciseness.

Referring to FIG. 1, there is illustrated a cargo container 16 comprising an over-the-road van-type semi-trailer which includes a floor 18, opposed side walls 20 and 22 and a roof 24. An abbreviated end wall 26 delimits, in cooperation with the floor 18, a rear opening 28 which is closable by an upward-acting sectional door in accordance with the invention and generally designated by the numeral 30.

Referring also to FIG. 2, the door 30 is characterized by a plurality of interconnected door panels or sections including a bottom section 32, one or more intermediate sections 34, one shown in FIG. 2, and a top section 36. A typical door for an over-the-road semi-trailer or van-type truck body is made up of a bottom section, a top section and three to five intermediate sections. Each of the sections has an overall height of about one foot and an overall width sufficient to close a door opening 28 on a conventional over-the-road cargo container and the like.

Figure 6:
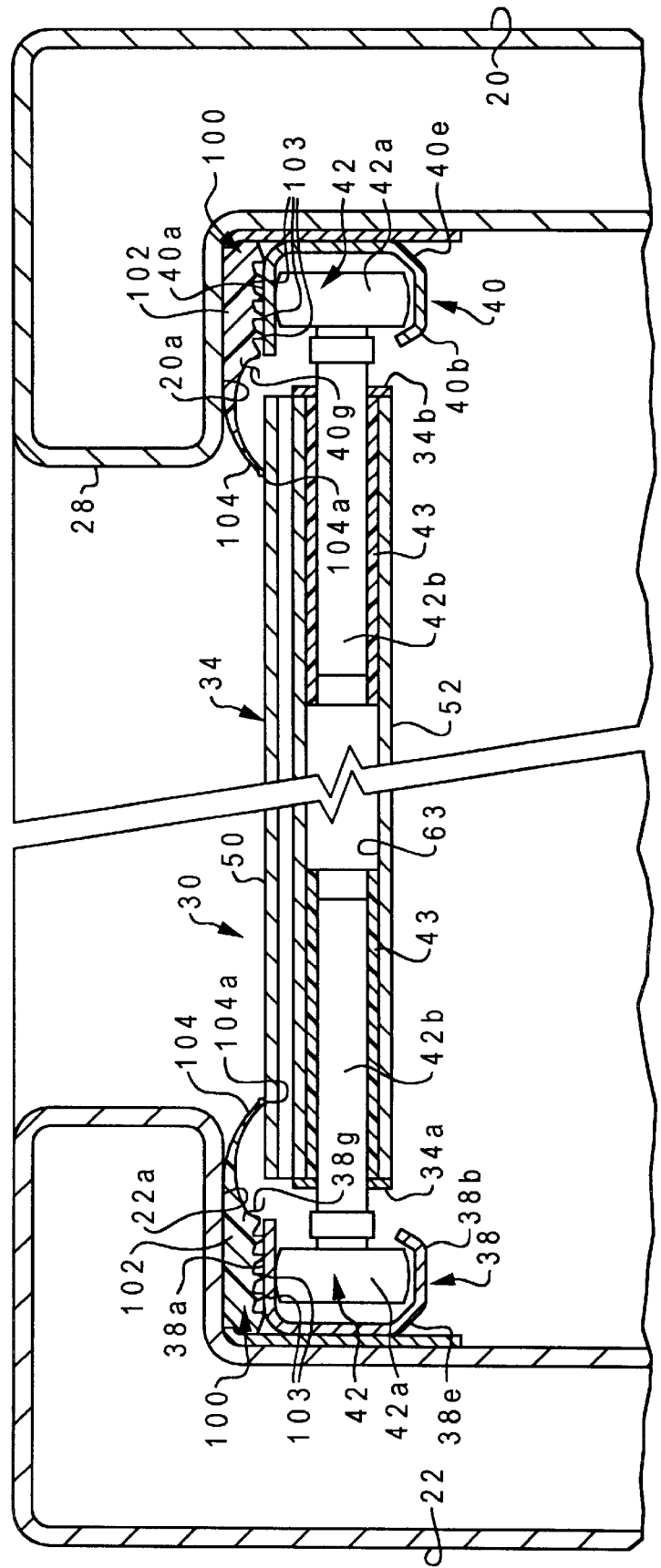
FIG. 6 is a section view taken generally from the line 6—6 of FIG. 1.

Referring further to FIG. 2, the door 30 is adapted to be suitably supported in a pair of opposed somewhat channel shaped guide tracks 38 and 40, see FIG. 6 also, which are mounted on sidewalls 22 and 20, adjacent re-entrant edge portions 22a and 20a, forming part of end wall 26 at a predetermined distance from such edge portions. Guide tracks 38 and 40 include generally planar flange portions 38a and 40a, respectively, and opposed flange portions 38b and 40b having suitable re-entrant edges for retaining door section guide members 42 therein, respectively, FIG. 6. The guide members 42 are characterized as cylindrical rollers 42a mounted on suitable axles or shafts 42b and suitably secured to respective ones of the door sections 32, 34 and 36 in a manner to be described in further detail herein. The guide tracks 38 and 40 include a generally vertically extending portion, see FIG. 2, which shows portion 40e for track 40, and a generally horizontal portion 40f. A conventional door counterbalance shaft and mechanism 41 is mounted in the cargo container or trailer 16 above the door opening 28 and is adapted to be connected to opposed lower edges of section 32 by spaced-apart cables, not shown, in a conventional manner. The guide tracks 38 and 40 and the counterbalance mechanism 41 are of generally conventional construction, known to those skilled in the art and, forming no part of the present invention, will not be described in further detail herein. In like manner, referring to FIG. 2, the upper section 36 is connected to spaced-apart brackets 37, one shown, which in turn are connected to respective door roller guide trucks 39, one shown, supported in tracks 38 and 40 for guiding the door for movement between the closed position shown and an open position wherein the door is substantially disposed in the horizontal portions of the guide tracks 38 and 40, also in a conventional manner.

Referring now to FIG. 4, one of the intermediate sections 34 is shown in vertical or transverse cross-section on a larger scale and is characterized by an extruded metal or plastic panel having spaced-apart coplanar side walls 50 and 52 and integral intermediate coextensive webs 54 spaced apart from each other. The side walls 50 and 52 are joined by a top wall 56 which slopes at an angle of about thirty-five degrees with respect to the outer side wall 50 and is integrally joined to an upward projecting somewhat arcuate hook-shaped hinge member 60. The panel or section 34 also includes an integral cylindrical support part 62 integrally formed with the top wall 56 and the inner side wall 52 and forming a continuous bore 63 for receiving opposed ones of the guide rollers 42, particularly the shaft portions 42b of same, see FIG. 6. The roller shafts 42b are disposed in suitable flanged elastomeric bushings 43 which are receivable in the bores 63, as shown in FIG. 6.

The inner side wall 52 is also intersected by spaced-apart elongated slots 66 and 68, FIG. 4, whose purpose will be described further herein. Each of the slots 66 and 68 is formed with opposed re-entrant edges and a narrowed mouth portion 66a and 68a, as shown. The section 34 is further provided with an integral bottom wall 70 joined to the side walls 50 and 52 and forming part of an arcuate channel 72 having substantially the same geometry as the hinge member 60, but of greater circumference. The channel 72 is also defined by a continuous integral pintle portion 74 having an elongated slot 76 formed therein with re-entrant edges and a narrowed mouth opening to a panel bottom edge 78, as shown. The bottom edge 78 includes a convex-curved transition part 78a which joins inner side wall 52. Each of the intermediate sections 34 is configured as illustrated in FIG. 4 and described above.

Figure 5:
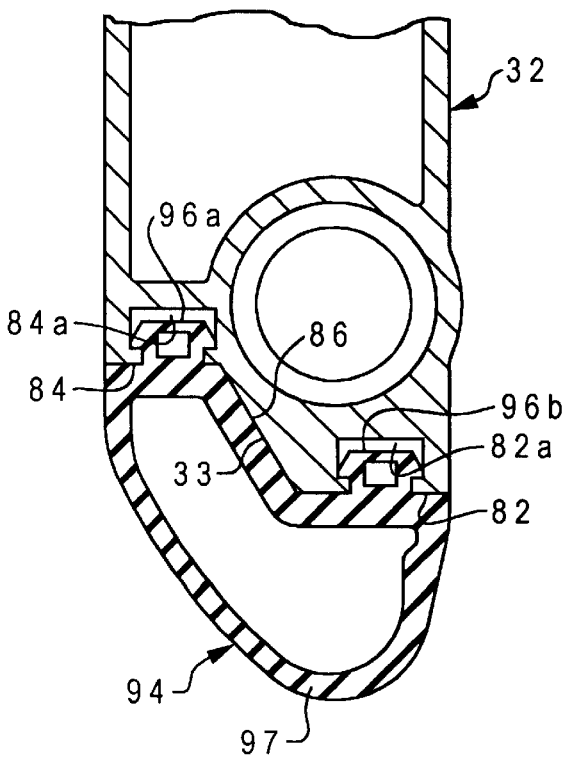
FIG. 5 is a detail section view showing the lower edge of the lower-most section or panel of the door shown in FIGS. 1 and 2 and also showing a seal member attached thereto.

Referring to FIG. 5, the bottom section 32 is similar to the section 34 except that a bottom wall 33 of the section 32 is defined by two spaced-apart but substantially parallel edge portions 82 and 84 joined by an intermediate wall portion 86. The bottom wall edge portions 82 and 84 are provided with elongated slots 82a and 84a, having re-entrant edges, respectively, to define a narrowed mouth opening toward the bottom side of the panel or section 32. The top edge of the section 32 is configured the same as the panel or section 34 and includes a hook-like arcuate hinge member 60, see FIG. 2.

Figure 3:
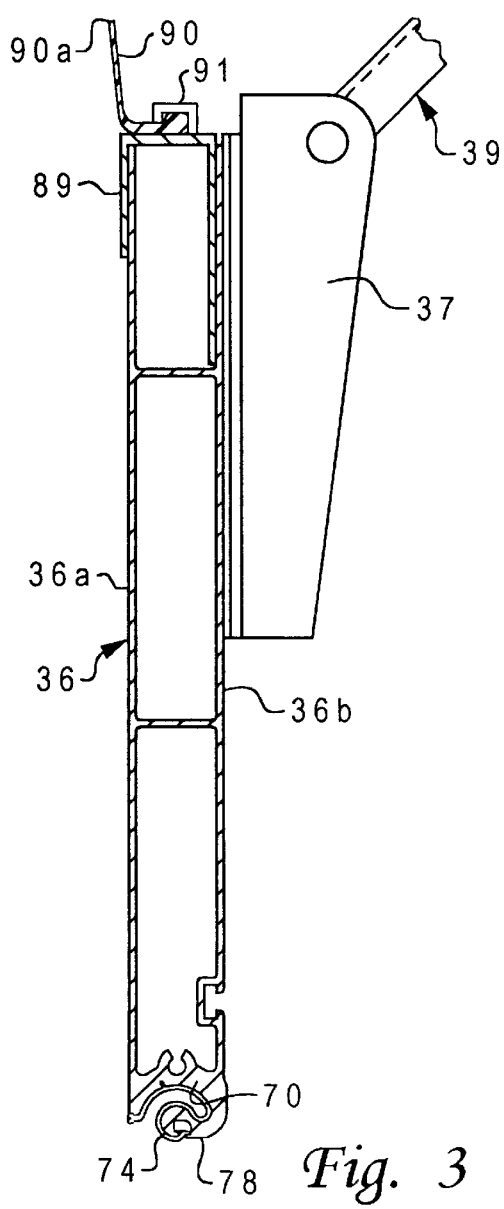
FIG. 3 is a detail section view on a larger scale of the upper door section or panel of the door shown in FIGS. 1 and 2.

Referring briefly to FIG. 3, the top panel or section 36 is configured similar to the section 34 as regards the bottom wall 70 and integral pintle portion 74 defining the arcuate groove 72. However, the top end of the section 36 is open for receiving a channel shaped insert 89 coextensive with and secured to inner and outer section side walls 36a and 36b. As shown in FIGS. 2 and 3, the top section 36 is provided with an elongated flexible flap-type elastomeric weather seal member 90 suitably secured to insert 89 by retainer means 91. A distal end 90a of the seal member 90 is engageable with an inner wall surface 26a of the rear wall 26 to form a seal along the top edge of the door 30 in the closed position thereof, FIG. 2.

Referring again to FIG. 5, when the door 30 is in a closed position, a door bottom edge seal is also formed by an elongated extruded elastomeric seal member 94. The seal member 94 includes spaced-apart elongated tongue portions 96a and 96b which are adapted to fit within the grooves 84a and 82a, respectively, to retain the seal member connected to the bottom edge of the section 32. The seal member 94 includes a flexible bottom edge 97 which is engageable with a floor surface 99, FIG. 2, at the edge of the floor 18 to form a bottom edge seal for the door 30 in its closed position.

Referring again to FIG. 6, one important aspect of the present invention is provided by improved door side edge seals comprising opposed seal members 100, each of which includes a thickened body portion 102 along one side of which are provided spaced apart laterally projecting elongated parallel ribs or teeth 103. The seal members 100 each also include an elongated flexible cantilever seal portion 104 which is tapered to a distal end 104a and is prefabricated with an elastic memory tending to deflect to forcible engagement with the outer wall 50 of a panel member or section 34, as shown, as well as the outer walls of sections 32 and 36 to form a substantial weather-tight seal at the side edges of the door 30. One advantage of the seal member 100 is that the body portion 102 and teeth 103 are dimensioned to be a force fit between the wall surfaces or edges 20a and 22a and the flange 40a of the guide track 40 or the flange 38a of the guide track 38, as the case may be, so that these seal members may be easily assembled to the cargo container 16 by being pushed into the spaces defined between the wall edges and the guide track flanges and suitably retained therein as a consequence of elastic deflection. In this way, if the seals 100 become worn or broken, they may be replaced by being forcibly pulled out through the spaces as described and shown. The teeth 103 are preferably formed to project at an acute angle toward the openings 40g and 38g, FIG. 6, formed between the wall surfaces 20a and 22a and the corresponding guide track flanges 40a and 38a when the seal members 100 are installed. In this way the teeth 103 resist easy dislodgment of the seal members 100 from their working positions. The seal members 100 may be fabricated of a suitable extruded or molded elastomer of a type normally used for resilient weather stripping or seal members. Accordingly, the door 30 is conveniently sealed around its entire periphery in the closed position to prevent exposure of an interior space 17, FIG. 2, of the cargo trailer 16 to the outdoor environment through the opening 28.

Referring now to FIGS. 7a through 7c, when a section 34 is interconnected to another section 34 or to a section 32 or when a section 36 is connected to a section 34, the arcuate hinge member 60 is disposed in the channel 72, as shown, to form a hinge connection between the adjacent sections. For the sake of discussion herein, two door sections 34 are shown connected to each other in FIGS. 7a through 7c and in FIG. 8. Once a hinge member 60 has entered a channel 72, it is desirable to limit the pivotal movement of one section of the door relative to the other about hinge axis 73, see FIG. 9 also, so that the sections will not become disconnected. In this regard, the door 30 is advantageously provided with an elongated molded or extruded retainer member 110 which has a generally planar base portion 112 and a head portion 114 which is configured to conform to the wall 56 and is also configured to provide some clearance for the pintle portion 74 and the bottom edge 78 of the adjacent door section. In this regard, a concave head portion 114a provides adequate clearance during the normal range of pivotal movement of one section 34 relative to the other. However, as shown in FIG. 8, the bottom edge 78, 78a will engage the concave head portion 114a to limit such pivotal movement in a manner which will prevent the hinge member 60 from exiting the groove 72 entirely. The retainer member 110 is preferably substantially coextensive with the overall width of a section 34, 32 or 36 between lateral side edges 34a and 34b, for example, FIG. 6, as described above.

Referring further to FIGS. 7a through 7c and FIG. 8, the retainer 110 preferably includes a generally flexible planar seal or deflector part 116 which is preferably integrally formed with but of a more flexible or lower hardness than the planar portion 112 and the head portion 114. The seal or deflector part 116 includes a distal edge portion 120 of enlarged cross section and provided with opposed resilient fingers 121 operable to snap into slot 68. Accordingly, when the combination retainer and seal or deflector member 110 is in a working position, as shown in FIG. 7c and FIG. 8, when one section 34 is rotated relative to the other upon opening the door 30, the seal and deflector part 116 will flex while providing a moisture deflector channel 119, FIG. 8, to prevent moisture which may accumulate on either side of the door 30 at a hinge connection between door sections from dripping directly into the interior cargo space 17. The retainer member 110 preferably also includes respective deflectable fingers 123 on planar portion 112 and which are insertable in the channel or slot 66 as shown, to aid in securing the retainer 110 connected to the sections 34 once the sections are assembled to each other. Additionally, the planar portion 112 of the retainer 110 may be firmly secured to a section 34 by spaced-apart self-drilling and tapping fasteners 124, one shown in FIGS. 7b and 7c, insertable through suitable fastener receiving bores 126, one shown in FIG. 7b. Accordingly, once a section 34 has been connected to an adjacent section 34 at the cooperating hinge parts 60 and 74, they are retained in assembly with each other, as would be a section 34 with a section 32 or a section 36, by the retainer 110.

Referring now primarily to FIG. 9, the door 30 is advantageously provided with an additional sealing member between the door sections which also may function as a bearing member for the hinge parts 60 and 74. As shown in FIG. 9, an elongated thin-walled, pre-formed seal liner and bearing member 130 is configured to fit within the groove 72 in snug relationship with respect to the bottom wall surface 70 and the surface 74a of pintle 74 throughout the longitudinal and lateral extent of these surfaces. The member 30 includes a head portion 132 which is disposed between the outer wall lower and upper edges 50b and 50a of adjacent sections 34, see FIG. 7b also, when the sections are in a closed position and the head portion is pinched therebetween to form a substantially weather-tight seal between door sections. The opposite end of the continuous molded liner or bearing member 130 includes laterally extending ears 136 and 137 which are registrable in the groove 76 and are suitably deflected when inserted therethrough and retained therein in the manner illustrated. Still further, the member 130 may be retained in the working position shown in tight engagement with the wall surface 70 by a radially projecting tab 133 which fits within a cooperating groove 135 formed in the wall, as shown. The tab 133 is designed to be a slight interference fit within the groove 135. The member 130 is preferably molded or extruded of a suitable elastomer material which may be a material exhibiting a low coefficient of friction and may be impregnated with a suitable lubricant or the like to provide a self-lubricating characteristic of the liner member, since it also functions as a bearing for the hinge part 60.

Referring now to FIGS. 10 and 11, the hinge connections between adjacent door sections of the door 30 are prevented from side to side displacement by cooperating stop tabs 140, one shown in FIGS. 10 and 11, suitably connected to a lower end of a panel 34, for example, at opposite side edges 34a and 34b, see FIG. 6. The stop tab 140 includes a semi-circular lower end portion 142 which covers the hinge area defined by the pintle 74, the wall surface 70 and the channel 72. Each stop tab 140 also includes a laterally extending upper flange part 146 which fits between the outer and inner side walls 50 and 52 of a section 34, for example, as shown in FIG. 11. Suitable threaded fasteners 143, one shown in FIG. 11, are operable to retain the stop tabs covering the hinge channel 72 on opposite sides of the sections 34 or 36 to prevent displacement of one section relative to the other, except about the pivot axes of the hinge connections between the sections.

Figure 12A:
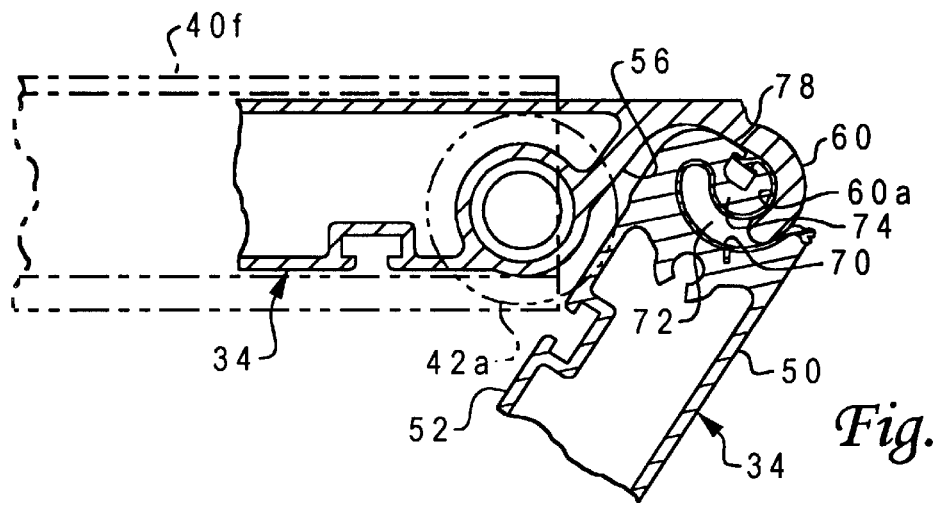
FIGS. 12a through 12c illustrate how the door sections may be assembled or disassembled with respect to each other.
Figure 12B:
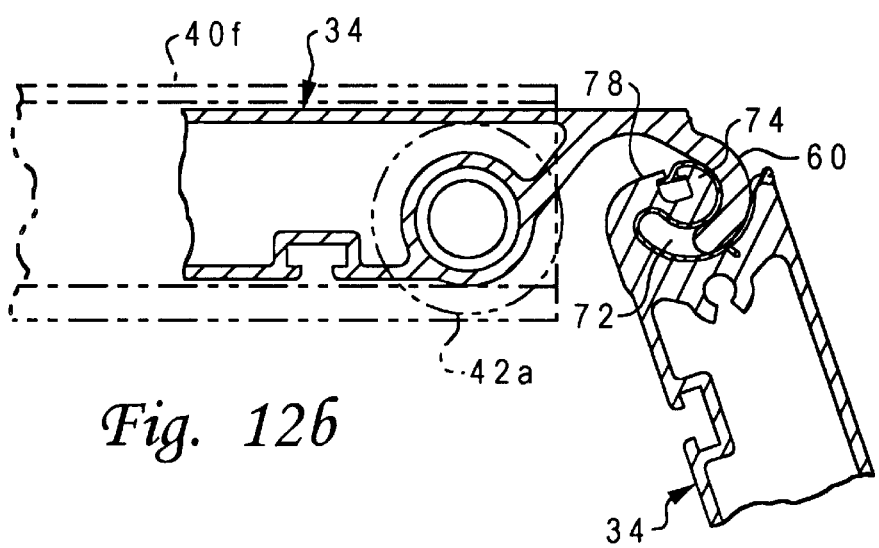
Figure 12C:
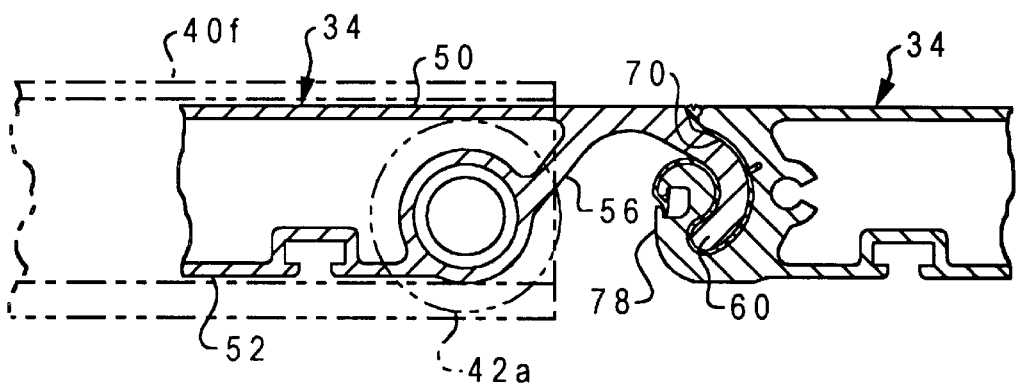

Referring now to FIGS. 12a through 12c, there is illustrated the manner in which one section 34 is connected to another section 34. The same procedure is used in which a section 36 is connected to a section 34 or a section 34 is connected to a section 32 at the cooperating hinge portions thereof, respectively. A section 32 or 34 is installed by sliding its support rollers 42a into the horizontal runs of the guide tracks 38 and 40 at the open distal ends thereof, respectively. Guide track section 40f is shown in FIGS. 12a through 12c. The section installed between and supported by the guide tracks 38 and 40 is positioned as shown in FIGS. 12a through 12c. Then, with the retainer and seal members 110 removed from adjacent sections 32 and 34, 34 and 34 or 34 and 36, one section may be connected to the other, as shown in FIG. 12a, by rotating one section until the inner wall 52 adjacent the lower edge 78 is generally parallel to the wall portion 56 of the section already supported on the guide tracks whereupon the pintle 74 may be nested in the throat 60a of the hinge member 60. A section 34 or 36 is then rotated relative to the other section 34 or 32 already supported on the guide tracks toward the position shown in FIG. 12b and finally to the position shown in FIG. 12c to interconnect the sections to each other. At this time the retainer member 110 may be assembled to the adjacent sections as shown in FIGS. 7a through 7c to retain the sections connected to each other. The sections just connected to each other as shown and described are then moved along the guide tracks to a position wherein the next section to be added to the door 30 may be connected in the same manner until the door is completely assembled.

The fabrication of the respective parts of the door 30 described hereinabove is believed to be within the purview of one of skill in the art of sectional doors, particularly doors used in mobile cargo containers and the like. As mentioned previously, the sections 32, 34 and 36 may be extruded of lightweight metal alloy or plastic materials of suitable strength. The members 43, 90, 94, 100, 110, 112 and 130 may be formed of suitably elastomeric polymer materials which are capable of being molded or extruded. The section stop tabs 140 may also be formed of suitable plastic or metal of adequate strength for retaining the sections connected to each other. Other components not specifically identified herein may be fabricated using conventional methods and engineering materials.

The assembly, disassembly and operation of the door 30 may be carried out by one of ordinary skill in the art based on the foregoing description. Typically, the sections 32, 34 and 36 are assembled to each other to make up the door 30 by assembling opposed roller 42 guide members to a section, sliding that section into the distal ends of track sections 38f and 40f while a longitudinal edge of the section to be connected to an adjacent section remains extending beyond the distal ends of the track sections. As previously mentioned the next door section to be added to the door is assembled to the section already supported by the guide tracks in the manner illustrated in FIGS. 12a through 12c. Additional sections are added in substantially the same manner. Once a door section is assembled to another, the stop tabs 140 are also secured to a section at opposite ends thereof. Disassembly of the door 30 may be carried out by substantially reversing the steps described above.

Although a preferred embodiment has been described in detail herein, those skilled in the art will recognize that various substitutions and modifications may be made without departing from the scope and spirit of the invention as recited in the appended claims.

What is claimed is:

1. A sectional, upward-acting door, particularly adapted for use as a door for a cargo container, comprising:
    a plurality of hingedly interconnected door sections including a top section, a bottom section and at least one intermediate section, said sections being joined to each other along cooperating edges by a hinge connection comprising an arcuate hook-shaped hinge member extending along the top edge of one section and a cooperating arcuate channel defined by a concave bottom wall and a pintle portion of an adjacent section wherein said arcuate hinge member slides within said channel about a hinge axis formed between said sections and whereby said sections may be assembled one to the other laterally with respect to said hinge axis; and
    a retainer member releasably secured to one of said sections adjacent to and spaced from said hinge member and engageable with an edge of an adjacent section to limit pivotal movement between said sections about said hinge connection.

2. The door set forth in claim 1 wherein:
    said retainer member includes a flexible member connected thereto and attached to an adjacent section to form a continuous moisture deflector channel at the hinge connection between said sections.

3. The door set forth in claim 2 wherein:
    said retainer member and said flexible member are integrally joined and co-extruded of materials having different degrees of hardness, respectively.

4. The door set forth in claim 2 wherein:
    said retainer member is releasably secured to said one section by fastener means.

5. The door set forth in claim 1 wherein:
    at least selected ones of said sections have opposed guide members connected thereto at opposite side edges of said selected sections, said guide members being disposed in elongated guide tracks, respectively.

6. The door set forth in claim 5 wherein:
    said guide tracks are mounted adjacent means forming an end wall of a cargo container defining an opening in said container closable by said door and said door includes side edge seal members forcibly retained in a space formed between said guide tracks and said means forming said end wall, said side edge seal members each including a flexible cantilever seal portion projecting laterally and engageable with an outer surface of said door to form opposed side edge seals for said door.

7. The door set forth in claim 6 wherein:
    said side edge seal members each include a body portion attached to said cantilever portion and including spaced-apart teeth which are elastically deflectable to allow forcibly inserting said body portion of said side edge seal member between said guide tracks and said means forming said end wall to retain said side edge seal members in a working position.

8. The door set forth in claim 7 wherein:
    said bottom section includes an elastomeric seal member extending along a bottom edge of said bottom section and engageable with a surface on said cargo container, said bottom edge seal member including an arcuate convex outer edge.

9. The door set forth in claim 1 wherein:
    said at least one intermediate section is formed of one of extruded metal and plastic and is defined by a generally planar outer wall, a generally planar inner wall spaced from said outer wall and integrally joined thereto by a transverse top wall and a transverse bottom wall, said top wall including said arcuate hinge member projecting therefrom and integrally joined thereto and said bottom wall defining with said pintle portion said channel for receiving the arcuate hinge member of an adjacent section.

10. The door set forth in claim 9 including:
    a bearing member conforming to the contour of said channel formed between said bottom wall and said pintle portion and forming a bearing surface for engagement with said hinge member of said adjacent section.

11. The door set forth in claim 10 wherein:
    said bearing member includes a distal head portion aligned with and engageable with a bottom edge of one section and a top edge of an adjacent section to form a seal at a joint between said sections when said door is in a closed position.

12. The door set forth in claim 11 wherein: said bearing member includes spaced-apart ear portions cooperable with groove means in said lower edge of one of said sections for retaining said bearing member in assembly therewith to define said channel for receiving a hinge member of an adjacent section.

13. A sectional, upward-acting door, particularly adapted for use as a door for a cargo container, comprising:

a plurality of hingedly interconnected door sections including a top section, a bottom section and at least one intermediate section, said sections being joined to each other along cooperating edges by a hinge connection comprising an arcuate hinge member extending along the top edge of one section and a cooperating arcuate channel defined by a concave bottom wall and a pintle portion of an adjacent section wherein said arcuate hinge member slides within said channel about a hinge axis and whereby said sections may be assembled one to the other laterally with respect to said hinge axis; and a seal and bearing member formed of a generally flexible nonmetallic composition conforming to the contour of said channel formed between said bottom wall and said pintle portion and forming a bearing surface for engagement with said hinge member of said adjacent section.

14. The door set forth in claim 13 including:

a retainer member releasably secured to one of said sections adjacent to and spaced from said hinge member and engageable with a bottom edge of an adjacent section to limit pivotal movement between said sections about said hinge connection.

15. The door set forth in claim 14 wherein:

said retainer member includes a flexible member connected thereto and attached to an adjacent section to form a substantially continuous moisture deflector channel at the hinge connection between said sections.

16. The door set forth in claim 15 wherein:

said retainer member and said seal member are integrally formed and are co-extruded of nonmetallic material having different degrees of hardness, respectively.

17. The door set forth in claim 13 wherein:

said at least one intermediate section is formed of one of extruded metal and plastic and is defined by a generally planar outer wall, a generally planar inner wall spaced from said outer wall and integrally joined thereto by a transverse top wall and a transverse bottom wall, said top wall including said arcuate hinge member projecting therefrom and integrally joined thereto and said bottom wall defining with said pintle portion said channel for receiving the hinge member of an adjacent section.

18. The door set forth in claim 13 wherein:

at least selected ones of said sections have opposed guide members connected thereto at opposite side edges of said selected sections, said guide members being disposed in elongated guide tracks, respectively, said guide tracks are mounted adjacent means forming an end wall of a cargo container defining an opening in said container closable by said door, and said door includes side edge seal members forcibly retained in opposed spaces formed between said guide tracks and said means forming an end wall and each including a flexible cantilever seal portion projecting laterally and engageable with an outside surface of said door to form a side edge seal for said door.

19. The door set forth in claim 18 wherein:

said side edge seal members each include a body portion attached to said cantilever portion and including spaced-apart teeth which are elastically deflectable to allow forcibly inserting said body portion of said side edge seal member into said space between said guide track and said means forming said end wall to retain said side edge seal member in a working position.

20. The door set forth in claim 13 wherein:

said bearing member includes a distal head portion aligned with and engageable with a bottom edge of one section and a top edge of an adjacent section to form a seal at a joint between said sections when said door is in a closed position.

21. The door set forth in claim 20 wherein:

said bearing member includes means cooperable with groove means in said lower edge of one of said sections for retaining said bearing member in assembly therewith.

22. The door set forth in claim 13 including:

opposed stop members adapted to be releasably secured to opposed edges of said at least one intermediate section and at least partially covering opposite ends of said channel.

23. A sectional, upward-acting door, particularly adapted for use as a door for a cargo container, comprising:

a plurality of hingedly interconnected door sections including a top section, a bottom section and at least one intermediate section, said sections being joined to each other along cooperating edges by a hinge connection comprising an arcuate hook-shaped hinge member extending along the top edge of one section and a cooperating arcuate channel defined by a concave bottom wall and a pintle portion of an adjacent section wherein said arcuate hinge member slides within said channel about a hinge axis and whereby said sections may be assembled one to the other laterally with respect to said hinge axis; and said sections are formed of one of extruded metal and plastic and are defined by a generally planar outer wall, a generally planar inner wall spaced from said outer wall and integrally joined thereto by a transverse top wall and a transverse bottom wall, said top wall of said at least one intermediate section and said bottom section including said arcuate hinge member projecting therefrom and integrally joined thereto, respectively, and said bottom wall of said at least one intermediate section ad said top section defining with said pintle portion said channel for receiving the hinge member of an adjacent section, respectively.

24. The door set forth in claim 23 including:

a generally flexible nonmetallic bearing member conforming to the contour of said channel formed between said bottom wall and said pintle portion and forming a bearing surface for engagement with said hinge member of said adjacent section.

25. The door set forth in claim 24 wherein:

said bearing member includes a distal head portion aligned with and engageable with a bottom edge of one section and a top edge of an adjacent section to form a seal at a joint between said sections when said door is in a closed position.

26. The door set forth in claim 24 wherein:

said bearing member includes means cooperable with groove means in said lower edge of one of said sections for retaining said bearing member in assembly therewith to define said channel for receiving a hinge member of an adjacent section.

27. The door set forth in claim 23 wherein:

at least selected ones of said sections have opposed guide members connected thereto at opposite side edges of said selected sections, said guide members being disposed in elongated guide tracks, respectively.

28. The door set forth in claim 27 wherein:

said guide tracks are mounted adjacent means forming an end wall of a cargo container defining an opening in said container closable by said door and said door includes opposed elongated side edge seal members forcibly retained between said guide tracks and said means forming said end wall, respectively, said side edge seal members each including a flexible cantilever seal portion projecting laterally and engageable with an outer surface of said door to form a side edge weather seal for said door.

29. The door set forth in claim 28 wherein:

said side edge seal members each include a body portion attached to said cantilever portion and including space-apart teeth which are elastically deflectable to allow forcibly inserting said body portion of said side edge seal member between said guide tracks and said means forming said end wall to retain said side edge seal member in a working position.

* * * * *